United States Patent [19]

Naumann et al.

[11] Patent Number: 4,565,557
[45] Date of Patent: Jan. 21, 1986

[54] CONTAINERLESS HIGH PURITY PULLING PROCESS AND APPARATUS FOR GLASS FIBER

[75] Inventors: Robert J. Naumann; Edwin C. Ethridge, both of Huntsville, Ala.

[73] Assignee: The United States of America as represented by the Administrator of the National Aeronautics and Space Administration, Washington, D.C.

[21] Appl. No.: 601,130

[22] Filed: Apr. 19, 1984

Related U.S. Application Data

[63] Continuation-in-part of Ser. No. 526,754, Aug. 26, 1983, abandoned.

[51] Int. Cl.[4] .......................................... C03D 37/027
[52] U.S. Cl. ............................................... 65/1; 65/2; 65/11.1; 65/12
[58] Field of Search ....................... 65/1, 2, 11.1, 21.3, 65/21.4, 12

[56] References Cited

U.S. PATENT DOCUMENTS

| | | | |
|---|---|---|---|
| 2,908,545 | 10/1959 | Teja | 65/2 X |
| 3,155,475 | 11/1964 | Ashman | 65/2 |
| 3,944,640 | 3/1976 | Haggerty | 65/2 X |
| 4,061,484 | 12/1977 | Aulich et al. | 65/2 |
| 4,344,787 | 8/1982 | Wong et al. | 65/21.4 |
| 4,363,646 | 12/1984 | Torobin | 65/5 |

OTHER PUBLICATIONS

Acusticfield Positioning for Containerless Processing, Ultrasonics, Nov. 1975, pp. 251-261, Whymark.

Primary Examiner—Robert Lindsay
Attorney, Agent, or Firm—Joseph H. Beumer; John R. Manning; Leon D. Wofford, Jr.

[57] ABSTRACT

Apparatus and method for pulling optical glass fibers in a containerless environment is disclosed which includes a single-axis acoustical levitation furnace (10) in which a specimen (S) is levitated and melted. A reflector unit (16) is carried in the interior of the furnace and includes a reflector (16a) disposed centrally about the acoustical axis of the levitator. The reflector unit includes a circular shroud (32) of insulation and a copper sleeve (34) inserted in the unit which is hollow at (34a) for receiving a cooling medium (38). A fiber pulling bore (40) is formed centrally in the reflector unit surrounded by cooling jacket (34a) to enhance solidification and formation of a fiber (F). A starting fiber strand is introduced into the melt and pulled outwardly through bore (40) whereby the specimen fiber is started and formed as pulled therethrough. In order to replenish the melt and thus enable a continuous process, a movable secondary reflector (42) is provided which captures a supplemental specimen pellet (46) and by movement of the reflector transfers it to the melt (S).

13 Claims, 5 Drawing Figures

CONTAINERLESS HIGH PURITY PULLING PROCESS AND APPARATUS FOR GLASS FIBER

ORIGIN OF THE INVENTION

The invention described herein was made by employees of the United States Government and may be manufactured and used by or for the Government for governmental purposes without the payment of any royalties thereon or therefor.

CROSS REFERENCE TO RELATED APPLICATION

This application is a continuation-in-part of application Ser. No. 526,754, filed Aug. 26, 1983, now abandoned.

BACKGROUND OF THE INVENTION

The use of optical fibers in information and communication systems is becoming increasingly popular due to their performance and transmission properties. The performance of the optical fibers depends on the purity by which they can be made and is directly proportional to the amount of losses which occur in the transmission of information through the fibers. Low losses and long lengths are very much desired.

Silica glass fibers have been made using chemical vapor deposition techniques in a semi-containerless environment. In this technique, silica is deposited inside an elongated cylinder using chemical vapor deposition techniques. The cylinder is heated to melt the silica and a fiber is pulled from the inside of the melt. These silica glass fibers have losses on the order of $2 \times 10^{-1}$ db/km. While this is sufficiently low for a practical optical communication network, there are considerable advantages and cost savings to be obtained could the losses be further reduced.

Fluoride glasses are attractive because of their extremely low theoretical transmission losses, particularly at infrared wave lengths. Theoretical losses for the fluoride glass fibers are on the order of $10^{-3}$ db/km, far below that of silica glass fibers.

Heretofore, the production of fluoride glass fibers has not been possible in a semi-containerless system such as that used for silica fibers because of the unavailability of suitable chemicals for reaction techniques such as chemical vapor deposition. The low viscosity of the liquid material makes fluoride fiber drawing difficult. Suitable apparatus and methods for producing fluoride glass fibers with a high degree of purity have not been provided heretofore.

Accordingly, an important object of the present invention is to provide a method and apparatus for producing high purity optical fibers.

Still another important object of the present invention is to provide a method and apparatus for producing high purity fibers of fluoride and other glass forming materials.

Still another important object of the present invention is to provide a method and apparatus for producing glass fibers in a containerless environment to increase the purity of the fibers.

Yet another important object of the present invention is to provide a method for melting and forming optical glass fibers in which physical contact of the melt with container walls is completely avoided during the entire process.

SUMMARY OF THE INVENTION

It has been found according to the present invention that high-purity fibers can be prepared by levitating a specimen of glass-forming material in a furnace at a temperature sufficiently high to maintain the specimen as a melt and drawing a fiber of the material from the melt. The melt is maintained in a position such that contact with container walls in the furnace is avoided. Levitation can be provided by directing acoustic wave energy so as to produce a stable node in which the melt is supported. Fiber may be drawn from the melt by insertion of a starting strand or wire and pulling. Cooling means are employed as necessary to enhance solidification of the fiber and enable effective pulling from the melt.

The invention provides the primary advantage of avoiding physical contact of the melt with container walls and thus eliminating crucible contaminants which would act as nucleation sites for unwanted crystallites that produce adverse optical absorption or scattering and limit the propogation of optical signals in the fiber. By elimination of hetereogenous nucleation sites, melts can be deeply undercooled, and the range of glass formation can be greatly extended. This opens the way for a variety of new materials such as fluoride glasses which cannot be formed into optical fibers by conventional processes. In addition, very low loss fibers can be produced from more conventional glass systems by use of the invention.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

In a preferred embodiment the invention is directed to production of high purity glass optical fibers in a containerless environment obtained by use of an acoustic levitation furnace. Containerless melting can take place in any suitable acoustic levitation furnace as disclosed by Whymark in "Acoustic Field Positioning for Containerless Processing", *Ultrasonics*, November, 1975, p. 251. This furnace consists of an insulated chamber heated by glow bars or other suitable heating elements capable of operating in a fluoride-compatible atmosphere. High intensity sound at a single frequency is generated by a St. Clair generator or other source and introduced into the furnace through a radiation baffle in the bottom.

Acoustic wave energy impinging on a reflector located near the top of the furnace undergoes reflections and forms standing waves with the incident wave. These standing waves produce alternating high and low pressure regions, the low pressure regions serving as energy wells and providing stable nodes as points of levitation. The melt is levitated at the first low pressure energy well below the reflector. High pressure regions along the acoustic axis provide a strong axial restoring force sufficient to support the specimen weight.

The furnace has a hole in the top along the acoustical axis in which is placed a sleeve made of cooper or other good thermal conductor. The sleeve acts as a heat sink for cooling the fiber as it passes through. The fiber is not in contact with the sleeve, and a quench gas may be introduced into the sleeve to enhance cooling and solidification and thus to enable effective pulling of the fiber. Means may also be provided for replenishing the melt by introduction of pellets into the melt from the side of the furnace, thus allowing continuous pulling of the fiber.

Figure 1:
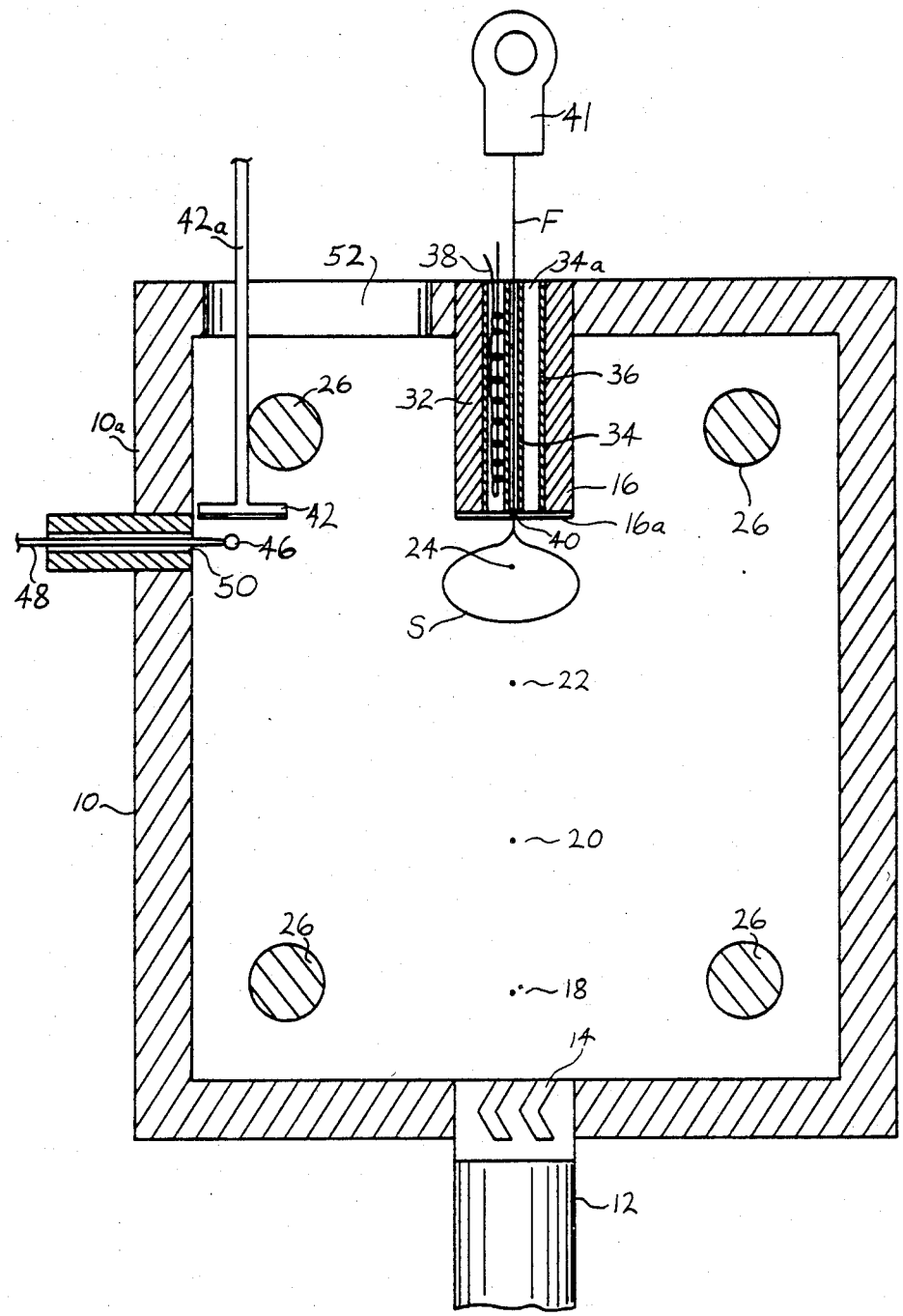
FIG. 1 is a schematic view illustrating a method and apparatus for producing high purity glass fibers in a containerless environment.

Referring now to FIG. 1, a modified single axis acoustic levitator furnace 10 is illustrated which includes an acoustical driver 12 which transmits acoustical waves through a radiation baffle 14 which prevents heating of the acoustical driver 12 while permitting the acoustical waves to be transmitted therethrough. A reflector unit is illustrated at 16 having a reflector 16a for reflecting the acoustical waves to create low pressure nodes at 18, 20, 22, and 24. Each of the nodes is surrounded by a low-pressure region or well (not shown), the upper most region around node 24 being used to support the glass-forming melt S. The furnace may be heated by any suitable resistant heater such as the rod heaters illustrated at 26 spaced in the furnace to provide uniform heating thereof. The specimen S of fluoride or other glass former may be inserted in a pellet form through a sample injection port 50. A number of solid pellets are then suspended at the levitation node 24 and heated until a melt is formed.

The reflector unit 16 includes a thermal insulation means in the form of a shroud of insulation 32 and a cooling sleeve member 34 which is inserted in bore 36 to provide cooling means. The cooling sleeve includes a hollow cooling jacket 34a so that a cooling medium 38 such as water or any other suitable quenching fluid such as a gas may be delivered in and out of the sleeve 34 for cooling the fiber F as it passes through a small fiber pulling bore 40 formed in sleeve 34.

Any suitable pulling starting strand such as a preformed glass fiber or platinum wire (not shown) is inserted through bore 40 contacting the melt S to start the pulling process described more fully hereinafter. Any suitable means at 41 may be provided for pulling the fiber F in a continuous process.

Sample size in the acoustic levitator furnace is limited to approximately one-quarter to one-half of the acoustical wavelength, which corresponds to sample size of about 1.2 cm at room temperature and 15 kHz in air.

For pulling continuous fibers, a means of replenishing the melt must be provided. This can be accomplished by adding a second, auxiliary reflector 42 to the furnace that can be moved from near an outside wall 10a to near the center reflector. An acoustic interference well (not shown) is also formed beneath this reflector which will support a second sample 46. New material may be introduced in the form of a solid pellet from an injector 48 in a side injector port 50 of the furnace.

Figure 2:
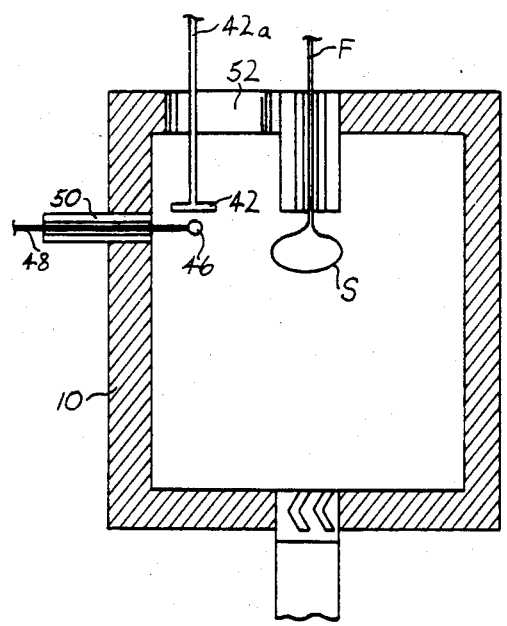
FIGS. 2, 3, and 4 are schematic illustrations showing operation of the method and apparatus of FIG. 1 to provide replenishment of the glass melt in a manner such as to enable continuous drawing of fibers.
Figure 3:
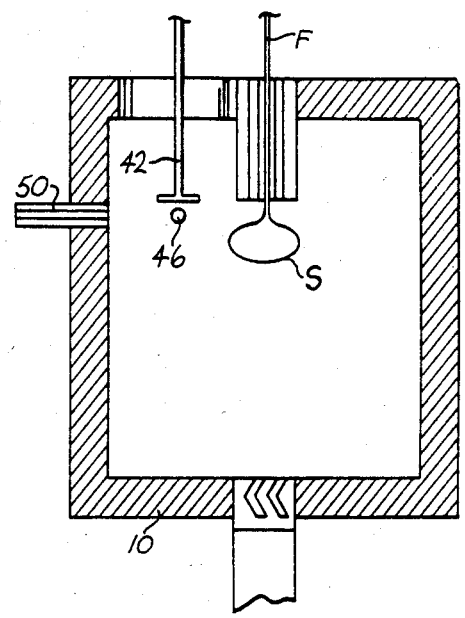
Figure 4:
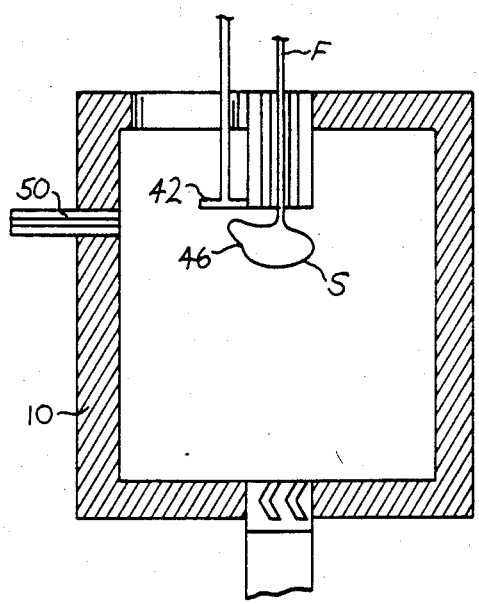
Figure 5:
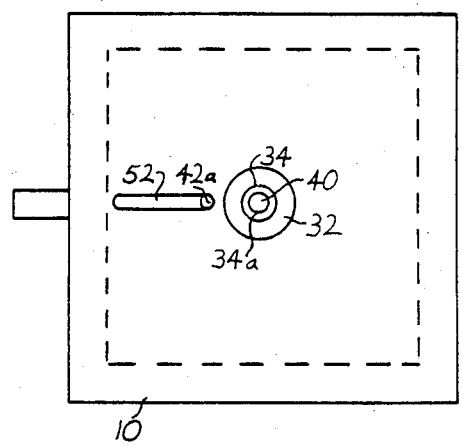
FIG. 5 is a top plan view of the apparatus of FIGS. 2 through 4.

Referring to FIG. 2 and FIG. 5, auxiliary reflector 42 is slidable in a slot 52 formed in the levitating furnace 10. The reflector 42 picks up an injected pellet 46 from the injector port 50, transports it to the center region of the furnace and transfers it to the melt S to enable continuous pulling. In accordance with the method for continuous pulling of glass fibers, as can best be described with reference to FIGS. 2-4, the supplemental injected pellet 46 is captured in the acoustic energy well 44 beneath the secondary reflector 42 and allowed to melt and thermally equilibriate. It is then transferred to the primary melt by moving the secondary reflector 42 across the furnace as shown in FIG. 3 to the area of the specimen melt S where it is incorporated in the melt as shown in FIG. 4. The sequence is repeated as necessary to replenish the melt from which the fiber is being pulled. Reflector 42 may be automatically or manually moved by handle 42a.

In accordance with the method, the acoustic field in a single axis interference levitator furnace is especially suitable for containerless melting and fiber pulling operations. The strong axial restoring forces provide both the mechanism for supporting the melt without physical contact as well as the constraining force to resist the pulling operation. The melt is levitated in the first energy well beneath the reflector located at a quarter of a wave length beneath the reflector to take advantage of the close proximity of the heat sink to the melt as well as the strong restraining force provided by the high pressure region at the face of the reflector.

After the glass forming material has been levitated, melted, and brought to thermal equilibrium at the optimum pulling temperature, pulling is initiated by inserting a fiber initiating means such as a glass or platinum fiber through the sleeve and withdrawing it at the desired rate. Fiber diameter is controlled by the pulling rate, the flow of quench gas, and the viscosity of the melt. If cladding of the fiber with an additional material is required, this operation may be accomplished by a suitable mechanism located in the reflector, such as drawing the fiber through a liquid melt or solution or by spraying a coating onto the fiber.

Single-axis interference acoustic levitation furnaces such as described above can routinely levitate glass melts at temperatures up to approximately 600–700 degrees C. However, the levitation forces decrease rapidly with increasing temperature and it becomes more difficult to levitate melts at higher temperatures. Some additional gain may be obtained by focusing the sound intensity by techniques described in U.S. Pat. No. 4,218,921. It is likely that containerless processing in unit gravity will be restricted to relatively low temperature glass systems with maximum melting points of about 700 degrees C.

These restrictions may be lifted, however, by carrying out the process in a low-gravity environment provided by an orbiting spacecraft. Additional advantages to be obtained by low-gravity processing, besides increased operating temperatures, are the elimination of drainage from the molten fiber back into the melt, which may permit lower viscosity melts to be pulled, and the elimination of gravity driven phase separation in multicomponent systems that contain components with different densities. These advantages may extend the range of materials that can be pulled into optical fibers by the containerless techniques.

By using containerless melting and pulling, extreme purity of the glass can be maintained. This will provide conventional optical fibers that have lower losses, and can be used to produce unconventional optical fibers from exotic glass systems that may have unique optical properties.

The use of the single-axis interference acoustic levitator furnace has a distinct advantage over other containerless processes in that the configuration of the acoustic field provides strong enough forces along the acoustic axis to support the melt at moderate temperatures and to constrain the melt during the pulling operation. This allows the process to be carried out in some degree in unit gravity. The interference feature of opposing supporting and constraining forces is particularly useful in that the system can operate at a single acoustic frequency and is self-tuning. This greatly simplifies the generation of the high intensity sound required for levitation and allows stable operation over a wide temperature range without having to compensate for the change in velocity of sound. Also the interference technique is required for replenishing the melt in the manner described.

While a preferred embodiment of the invention has been described using specific terms, such description is for illustrative purposes only, and it is to be understood that changes and variations may be made without departing from the spirit or scope of the following claims.

We claim:

1. Apparatus for producing optical glass fibers from specimen material comprising:
   a levitation furnace having a levitation axis along which said material may be levitated;
   means for heating said material to form a melt;
   a fiber pulling bore formed in said furnace housing through which bore said material may be pulled from said melt in fiber form;
   cooling means surrounding said bore to cool said fiber;
   insulation means encasing said cooling means and fiber pulling bore;
   fiber initiating means; and
   means for generating a restoring force along said levitating axis in one direction for levitating said specimen and for constraining said melt against pulling of fiber in an opposing direction so that said melt is stably levitated during fiber pulling.

2. The apparatus of claim 1 wherein said apparatus includes:
   a single-axis acoustical interference levitation furnace having a housing;
   an acoustical driver carried at the bottom of said furnace housing for generating and delivering acoustical energy into said furnace along said levitating axis; and
   a reflector unit carried by the top of said furnace housing, said reflector unit having a reflector surface for reflecting said acoustical energy to provide said restoring force at said levitation node.

3. The apparatus of claim 2 wherein said fiber pulling bore is formed centrally in said reflector unit.

4. The apparatus of claim 3 including means for replenishing said material in said melt so as to enable continuous pulling of said fiber.

5. The apparatus of claim 4 wherein said means for replenishing includes an insertion port carried by said furnace housing.

6. The apparatus of claim 5 including means for transferring inserted material from said entry port to said melt.

7. The apparatus of claim 6 wherein said means for transferring includes an auxiliary acoustical reflector movably carried in said housing for creating an energy well therebeneath for capturing said inserted material and moving it to said melt.

8. A method of producing high purity glass optical fibers comprising:
   supporting a specimen of material in a levitation furnace;
   levitating said specimen at a levitation node in said furnace without physical contact with a container or the like to provide a containerless environment;
   melting said material specimen without physical contact at said levitation node in said containerless environment;
   introducing a fiber starting strand into said specimen melt in said furnace;
   pulling said starting strand to start the production of a fiber strand of said melt;
   cooling said melt as it is pulled to form said fiber strand; and
   pulling said fiber strand outwardly from said furnace.

9. The method of claim 8 including supplying additional specimen material continuously to said specimen melt at said levitation node so that fiber may be pulled continuously from said melt.

10. The method of claim 8 including levitating said specimen melt in an acoustical levitating furnace having a reflector.

11. The method of claim 10 including levitating said specimen melt at a first levitation node beneath said reflector.

12. The method of claim 10 including levitating said specimen melt at a levitation node approximately one-quarter of a wave length below said reflector.

13. The method of claim 8 including levitating said specimen in an acoustical levitation furnace having a single interference axis along which restoring forces act supporting said specimen without physical contact and constraining said specimen to resist the pulling of said fiber strand therefrom.

* * * * *